Patented Sept. 16, 1952

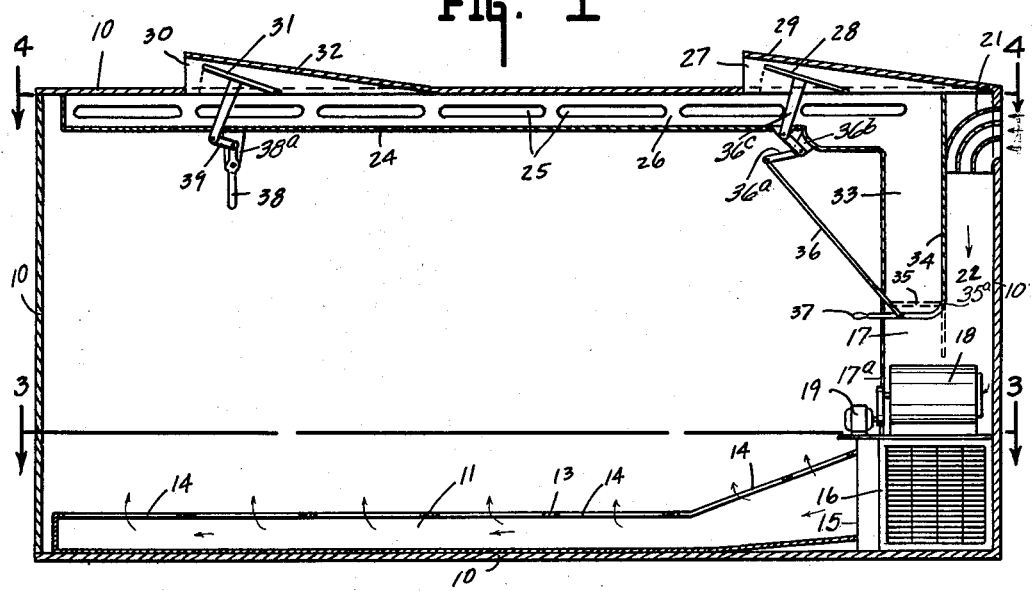
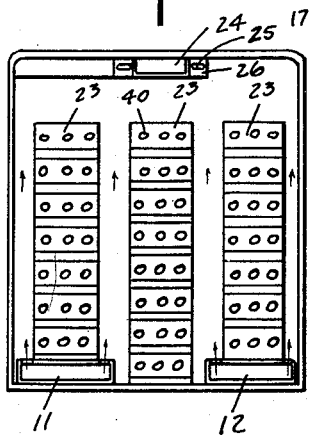
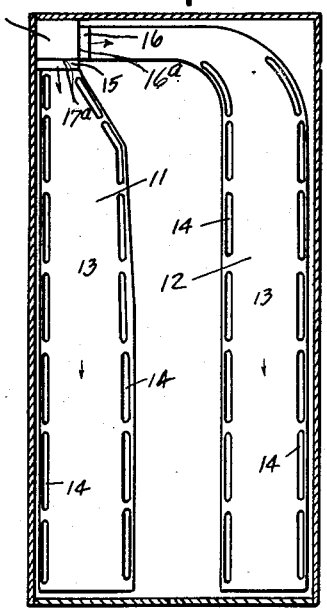
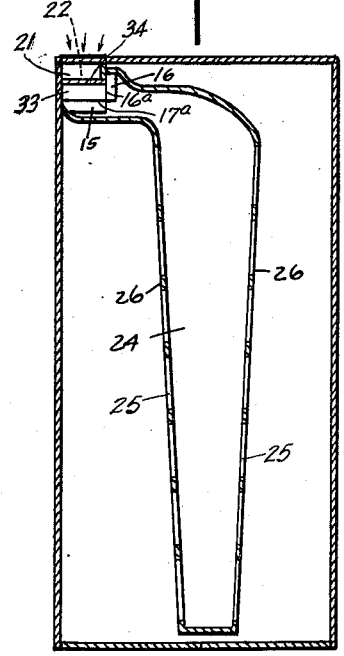

2,610,567

UNITED STATES PATENT OFFICE 2,610,567

VENTILATING AND HEATING SYSTEM

Philip B. Davis, Greenland, N. H.

Application December 9, 1949, Serial No. 132,161

2 Claims. (Cl. 98—10)

This invention relates to a ventilating and/or heating system for use particularly in trucks carrying young "chicks."

It is the primary object of this invention to provide a ventilating and/or heating system which is adapted to recirculate air, heated or otherwise, or to supply fresh air continuously from the outside to the interior of a truck carrying young chicks.

The transportation of young chicks from one point to another is attended by many difficulties. It is imperative that an even distribution of air be provided, but this is normally not easily accomplished. If the chicks are exposed to too much outside air they become chilled and die. On the other hand, if they receive too little, they may die because of lack of oxygen. Again, they may become overheated, which can result in stunted growth.

It is a further object of this invention to provide a system which will result in a uniform distribution of air to the chicks at all times.

It is a still further object of this invention to provide a system having all of the above mentioned advantages while at the same time occupying a minimum amount of space within the truck.

The primary feature of the invention resides in the provision and arrangement of slotted supply and return ducts, the supply ducts being located on the floor of the truck and the return ducts being positioned adjacent the top of the truck.

A further feature resides in the provision of adjustable exhaust ports in the return ducts for use in exhausting air from the truck or in channelling the air through the return duct for recirculation purposes.

Other objects and features of the invention will be set forth more fully hereinafter.

The full nature of the invention will be understood from the accompanying drawings and the following description and claims:

In the drawings Fig. 1 is a longitudinal section view through a truck provided with the system.

Fig. 2 is an end view thereof.

Fig. 3 is a transverse section view taken on line 3—3 of Fig. 1 in the direction of the arrows.

Fig. 4 is a transverse section view taken on line 4—4 of Fig. 1 in the direction of the arrows.

In the drawings, 10 shows the top, floor and end walls respectively of a truck body within which the invention is housed. Positioned on the floor of the body adjacent the side walls, and extending longitudinally thereof are two supply ducts 11 and 12. Formed at intervals along the entire length of the upper wall 13 of each duct are the opposed air escape slots 14.

Positioned adjacent the front end of the truck interior are heating units 15 and 16 which confront respectively the supply ducts 11 and 12. These heating units are arranged in right angle relation relative to each other and, together with the side and end walls of the truck which their outside ends abut, they form an air chamber 17 from which the air is propelled into the ducts. It will be observed that ducts 11 and 12 are disposed respectively adjacent the side walls of the truck. Duct 12 is substantially L-shaped as shown and is connected to the air chamber and heating unit 16 in right angular relation to duct 11 and heating unit 15. Mounted immediately above the heating units is the blower fan 18 powered by the electric motor 19. The outside air which enters the truck interior through the louvers 21 is drawn downwardly through the chamber 22 into the air chamber, through the heating units and into the respective ducts. Chamber 22 is defined by the front end wall of the truck, by partition or flue 34, by the side wall of the truck and by partition or flue 16a.

The ducts are adapted to have stacked thereon in tiers, a plurality of apertured boxes 23 containing young chicks. The width of the ducts is such that the boxes can be accommodated between the oppositely disposed slots.

Secured to the top of the truck body and extending longitudinally thereof is the substantially L-shaped tapered return duct 24 having slots 25 formed at intervals in its side walls 26. Adjacent the front end of the return duct there is provided a main exhaust 27 including a damper 28 pivotally secured to the truck top and opening upwardly therethrough into a cowling 29. Adjacent the rear end of the return duct is a second and auxiliary exhaust 30 having a damper 31 pivotally secured to the truck top and opening therethrough into the cowling 32.

Extending downwardly from the front end of the return duct is an extension portion 33 which opens into the chamber 22 and is separated therefrom by the partition 34. The perpendicularly disposed partition 17a extends downwardly from the lower front portion of the upper or return duct and is connected to the heating member 15. A damper 35 is adapted to close the return duct extension portion. Both dampers 28 and 35 are so connected by linkage as to be moved simultaneously. This linkage includes rod 36 having a control handle 37. The handle is mounted on the side of partition or flue 16a, and at one end has a pivot pin 35a which extends through said partition. The damper is integral with said pin. Consequently, as handle 37 is swung, the pivot pin and its integral damper swing with it. Pivotally connected to the opposite end of rod 36 is a linkage 36a which in turn is pivotally connected to the depending member 36b secured to the lower face of the upper or return duct. Pivotally connected to the other end of linkage 36a is the damper arm 36c. When the handle 37 is moved downwardly the damper 35 is opened while at the same time, damper 28 is closed. The reverse operation opens the main exhaust damper and closes damper 35. It is of course possible to partially open both when some recirculation and some air discharge is desired. Damper 31 may be adjusted to open or closed, or to an intermediate position through the use of the handle 38. This handle is pivotally connected to the depending element 38a secured to the under face of the upper or return duct. Pivotally connected to one end of the handle is the linkage 39. The other end of the linkage is fixedly secured to the damper 31.

After the chick boxes are stacked in tiers as desired, the truck starts for its destination. Outside air rushes into the chamber 22 through the louvers 21. The blower fan draws it downwardly into the air chamber where, if the air is too cold, it is heated and then is forced through the supply ducts. The slots provided in these ducts permit the air to escape therefrom and to pass upwardly towards the return duct, thoroughly and uniformly ventilating the chick boxes which have apertures 40 formed therein. The air enters the return duct through the slots formed in the side walls thereof. If it is desired to recirculate the air rather than exhaust it, the dampers of the main and auxiliary exhausts are of course closed while the damper of the extension portion remains open. If the temperature of the outside air is at the desired point, it will of course be unnecessary either to heat it or to recirculate it. The exhaust dampers can be left in an open position to permit the exhausting of the air before the circuit is completed. It is also possible, by controlling the degree to which the dampers are opened, to recirculate a part and to exhaust a part of the air.

While the invention has been illustrated and described in great detail in the drawings and foregoing description, the same is to be considered as illustrative and not restrictive in character.

The invention claimed is:

1. A ventilating system for use in chick carrying trucks comprising a chamber disposed in the front end of said truck and being in communication at its upper end with the outside air, a pair of right angularly disposed heating units mounted on the floor of said truck adjacent one of the forward corners thereof, said units together with the side and front wall of said truck forming a chamber in communication with said first mentioned chamber, a blower fan mounted immediately above said last mentioned chamber, a pair of supply ducts positioned on the floor of said truck and extending substantially the entire length thereof, one of said ducts being in communication with one of said heating units and extending along a side wall of said truck, the other of said ducts being substantially L-shaped, extending along the other side wall of said truck and being in communication with said other heating unit, said ducts each having a plurality of opposed slots formed along the marginal edges of its upper face, both of said ducts having a width sufficient to support thereon in tiered relation between opposed slots a plurality of apertured chick boxes, a return duct mounted at the top of said truck and extending substantially the entire length thereof, said return duct communicating with said first mentioned chamber and having a plurality of slots formed in spaced relation through the side walls thereof, an exhaust outlet formed in said return duct intermediate the ends thereof and communicating with the outside air, a damper element overlying said outlet for controlling the amount of air exhausted from said return duct, and a second damper element disposed at the point of communication between said return duct and said first mentioned chamber for controlling the amount of air recirculated through said system.

2. A ventilating system for use in chick carrying trucks comprising a chamber formed in the forward end of said truck and being in communication adjacent its upper extremity with the outside air, a pair of ducts communicating with said chamber adjacent its lower extremity and at substantially right angular relation one to the other, one of said ducts extending along one side of said truck and the other being of substantially L formation and extending along the other side of said truck, blower means mounted in said chamber for impelling air into said ducts, said ducts each having a plurality of opposed slots formed along its marginal edges in the upper face thereof and having a width sufficient to support thereon a plurality of tiered chick boxes between said opposed slots, a return duct mounted to the top wall of said truck extending substantially the entire length thereof and being in communication at its forward end with said chamber, said return duct having a plurality of slots formed in its side walls, an exhaust outlet formed in said return duct intermediate the ends thereof and communicating with the outside air, means for controlling the passage of air through said exhaust outlet, a second exhaust outlet formed in said return duct adjacent its forward end, damper means for controlling the passage of air through said second exhaust outlet, a damper element mounted in said return duct adjacent its point of communication with said chamber, means for simultaneously controlling said second mentioned exhaust outlet damper means and said damper element, said means comprising a handle pivotally connected exteriorly of the walls defining said chamber, said damper element being integral with said pivotal connection, and linkage connecting said handle and said damper means whereby a movement of said handle simultaneously opens said damper element and closes said damper means or vice versa.

PHILIP B. DAVIS.

REFERENCES CITED

The following references are of record in the file of this patent:

UNITED STATES PATENTS

| Number | Name | Date |
|---|---|---|
| 2,036,672 | Anderson | Apr. 7, 1936 |
| 2,080,757 | Blomberg | May 18, 1937 |
| 2,291,220 | Germonprez | July 28, 1942 |
| 2,300,848 | Shelton | Nov. 3, 1942 |
| 2,383,423 | Steins | Aug. 21, 1945 |